United States Patent
Sayers et al.

(10) Patent No.: US 8,208,932 B2
(45) Date of Patent: *Jun. 26, 2012

(54) SYSTEM FOR MOBILE BROADBAND NETWORKING USING DYNAMIC QUALITY OF SERVICE PROVISIONING

(75) Inventors: Ian Sayers, Redwood City, CA (US); Jan Long, San Francisco, CA (US)

(73) Assignee: Tadaaki Chigusa, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,905

(22) Filed: Jul. 4, 2011

(65) Prior Publication Data

US 2011/0273989 A1 Nov. 10, 2011

Related U.S. Application Data

(63) Continuation of application No. 12/563,738, filed on Sep. 21, 2009, now Pat. No. 7,974,629, which is a continuation of application No. 10/447,335, filed on May 28, 2003, now Pat. No. 7,610,050.

(60) Provisional application No. 60/403,786, filed on Aug. 14, 2002.

(51) Int. Cl.
*H04W 40/00* (2009.01)

(52) U.S. Cl. ... 455/445; 455/11.1; 455/41.2; 455/452.1; 455/452.2; 455/453; 709/238; 709/239; 709/240; 709/241; 709/242; 709/243; 370/231; 370/235; 370/236; 370/237; 370/238; 370/408; 370/411

(58) Field of Classification Search ........ 455/41.1–41.2, 455/445–451, 452.1–452.2, 453, 11.1, 502–503, 455/507–519, 456.1, 456.5, 522; 370/229–238, 370/252–253, 400–411; 709/238–244

See application file for complete search history.

(56) References Cited

U.S. PATENT DOCUMENTS

| | | | | |
|---|---|---|---|---|
| 5,745,884 A * | 4/1998 | Carnegie et al. | | 705/34 |
| 5,892,908 A * | 4/1999 | Hughes et al. | | 709/250 |
| 5,987,011 A * | 11/1999 | Toh | | 370/331 |
| 6,430,395 B2 * | 8/2002 | Arazi et al. | | 455/41.2 |
| 6,522,881 B1 * | 2/2003 | Feder et al. | | 455/437 |
| 6,580,700 B1 * | 6/2003 | Pinard et al. | | 370/332 |
| 6,590,928 B1 * | 7/2003 | Haartsen | | 375/134 |
| 6,744,740 B2 * | 6/2004 | Chen | | 370/255 |
| 6,834,192 B1 * | 12/2004 | Watanabe et al. | | 455/444 |
| 6,888,811 B2 * | 5/2005 | Eaton et al. | | 370/338 |
| 6,894,985 B2 * | 5/2005 | Billhartz | | 370/252 |
| 6,954,435 B2 * | 10/2005 | Billhartz et al. | | 370/252 |
| 7,177,295 B1 * | 2/2007 | Sholander et al. | | 370/338 |
| 7,245,602 B2 * | 7/2007 | Skubic et al. | | 370/338 |
| 7,339,897 B2 * | 3/2008 | Larsson et al. | | 370/252 |

* cited by examiner

*Primary Examiner* — Tuan A Tran
(74) *Attorney, Agent, or Firm* — Silicon Valley Patent Group LLP

(57) ABSTRACT

A wireless networking system uses mobile and fixed transceivers to achieve a network with changing topology. A routing process includes quality-of-service considerations in the network to allow for features such as file or other data transfer, streaming audio and video, digital telephone communications, etc. The routing process adapts to transceiver units entering, leaving, or moving within, the network. Auxiliary networks such as the Internet, campus or corporate intranets, home networks, etc., can be accessed through the wireless network. Features, designs and user interfaces for the units are described. Security and access control of media content and other data is presented.

21 Claims, 1 Drawing Sheet

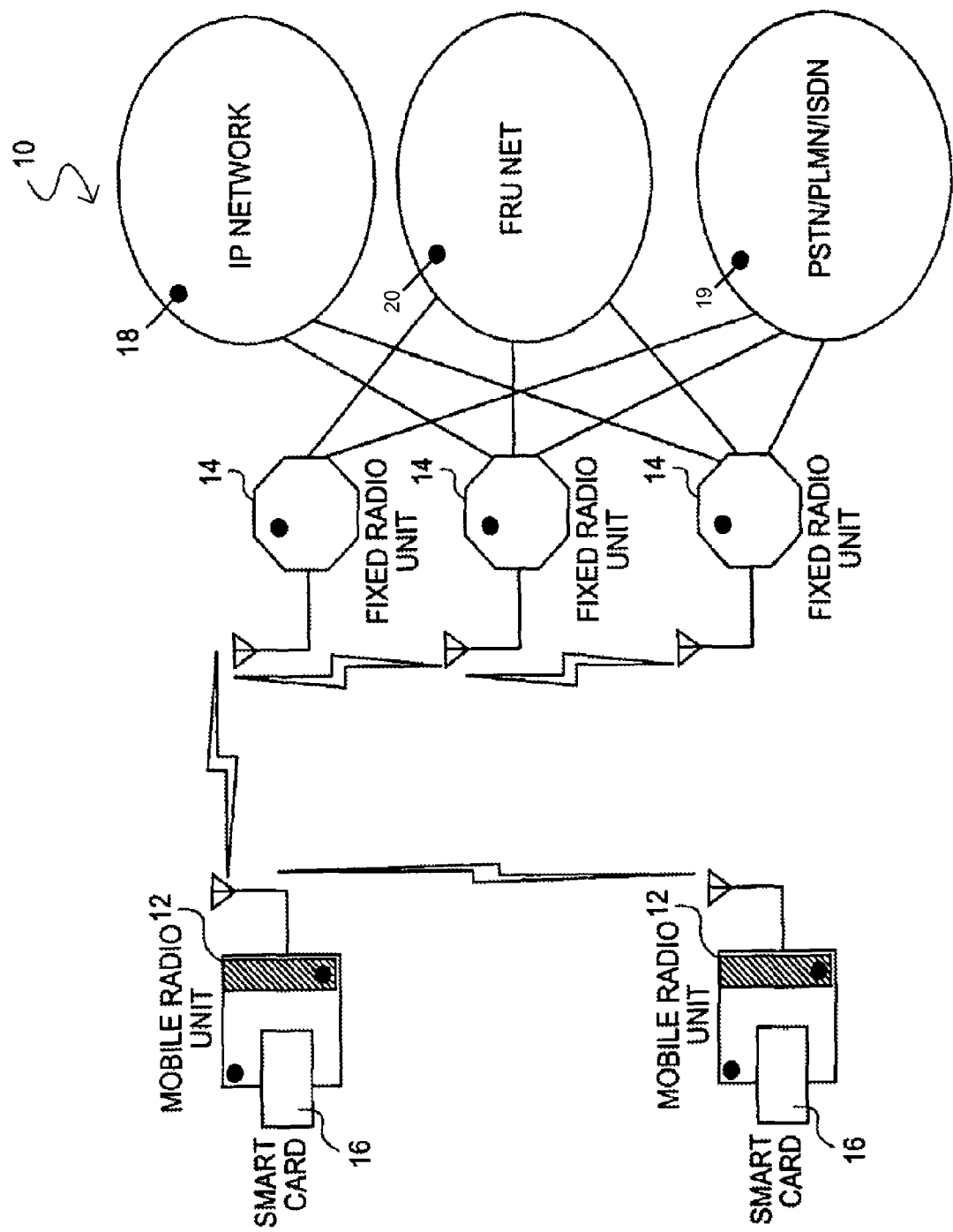

SYSTEM FOR MOBILE BROADBAND NETWORKING USING DYNAMIC QUALITY OF SERVICE PROVISIONING

CROSS-REFERENCE TO RELATED APPLICATIONS

This application is a continuation of and claims the benefit under 35 U.S.C. 120 of application Ser. No. 12/563,738, now U.S. Pat. No. 7,974,629, issued Jul. 5, 2011, which claimed the benefit under 35 U.S.C. 120 of U.S. Pat. No. 7,610,050, issued Oct. 27, 2009, which claimed priority under 35 U.S.C. 119(e) of U.S. Provisional Application Ser. No. 60/403,786, filed on Aug. 14, 2002, each titled "System for mobile broadband networking using dynamic quality of service provisioning" and each of which are incorporated herein by reference.

BACKGROUND OF THE INVENTION

1. Field of the Invention

The present invention relates in general to network communications and, more specifically, to a system having fixed and mobile wireless transceivers with dynamic routing based on quality-of-service criteria in order to optimize data transfers in a network with dynamically changing topology.

2. Background

Wireless networks are gaining in popularity. Standards such as 802.11a, 802.11b, 802.11g, Bluetooth, Ultra Wideband (UWB), etc., allow users to connect wirelessly via portions of the radio-frequency spectrum. As the cost of wireless network systems decreases and their popularity increases, these systems are becoming more prevalent. Some provide channels for relatively unrestricted transfer of information among various devices. The devices can be owned or operated by different users without formal registration, certification, administrator approval or other access restrictions. In cases where mobile wireless transceivers are used, there can be a constant change in the number and type of devices accessing a wireless network.

The types of wireless systems available today have shortcomings for some applications. The 802.11a, 802.11b and 802.11g standard systems have two modes of operation: infrastructure and Ad-Hoc. The infrastructure mode uses a dedicated radio controller and is primarily designed to provide a direct wireless link to a standard Ethernet network connection. The "Ad Hoc" approach allows for peer-to-peer networking, so that a very small network of several PCs on the same wireless channel can share files. The nodes in this network control their own access to the wireless media. The Ad Hoc mode is primarily used to temporarily interconnect a few computers together where an Ethernet backbone may not be available or an emergency network is required. There is no means of gaining access to the corporate Ethernet network or an Internet connection. As such, neither scheme is designed for "multi-hop" transmission. In a "multi-hop" scheme, data is transferred through intermediary wireless transceivers before arriving at the destination receiving device.

Generally, the quality of a communications channel in a wireless network is not guaranteed so that, for example, a software process executing on a device is not guaranteed a specific transfer rate over any given interval of time. This makes it very difficult to provide services that require a consistent bit or packet error rate (BER or PER); services such as streaming media, video and audio fall into this category.

Other approaches to wireless communications do not provide a comprehensive system design approach. For example, UWB only defines a radio physical layer. This merely defines how bits will be transmitted on the radio interface physical connection. There is no definition for a flexible protocol to allow coordination of devices, channels, links, etc., within a UWB wireless network. Bluetooth does include several features for point-to-point communications between devices, but does this based on a master-slave relationship that is difficult to use in a network with changing topology, such as one made up of mobile wireless transceivers. In addition, all the nodes within the Bluetooth network must be able to see at least the master for coordination purposes. This clearly limits the operational range of the network.

Other considerations for a flexible wireless communication system include scalability, range, user interface presentation, network management, minimization of radio interference, creation of user features to generate market desirability, security and access controls, physical design, features and operation of the devices, etc.

Hence, it would be desirable to provide a wireless network that employs a dynamically changing topology to accommodate user mobility and that is also capable of accepting and handling heterogeneous user traffic from multiple devices in a more efficient manner.

SUMMARY

The system of the present invention allows multiple wireless transceivers to flexibly communicate in a managed and optimized manner in a network that has a dynamic topology. In a preferred embodiment, two types of transceivers are used. One is a mobile radio unit (MRU or "mobile unit") and one is a semi-fixed, or fixed radio unit (FRU or "fixed unit"). The mobile unit could be a handheld or portable computing device equipped with radio-frequency (RF) send and receive capability. The fixed unit is a larger processing system, such as a personal computer, server, etc., that typically includes a more powerful radio transceiver and, therefore, longer range RF transmission capabilities.

The mobile units are equipped to present consumer-oriented features such as music (or other audio) playback and recording, address book, calendar, data storage and transfer, etc. Other features can include: digital telephone; local, downloaded or streamed video playback; etc. Various aspects of the hardware, software and physical design of the mobile units are further described below.

In a preferred embodiment of the present invention, fixed units are envisioned to reside in a home with one or more mobile units registered to a specific fixed unit. Both fixed and mobile units can communicate with each other over short or longer range radio channels. The units transfer data or communicate over one or more "hops," where a "hop" allows communication between two units whether fixed or mobile, in which a first unit communicates with a second unit that is outside of the range of the first unit but communication is achieved through transfer of data through intermediary units so that the data can ultimately be relayed through the intermediary units to the second unit. "Hopping" refers to dynamically changing one or more intermediary units to add, delete, change or modify the intermediate relay points. Alternatively, two nearby units may communicate directly without the need for an intermediary unit.

Since the majority of the units in the network are mobile, the unique procedures elaborated in the present invention are able to perform routing in a wireless network environment or topology which is continuously changing. This means that data is transferred between fixed or mobile units by "hopping" between dynamically changing intermediate units. Importantly, the fixed units may act as intermediate units under the "hopping" method of the present invention. The best path between a sending and receiving unit can change from transmission to transmission, or even within a single transmission, as the underlying topology of the network changes, mobile units are moved or their availability changes for other reasons.

One feature of the wireless system of the present invention is a routing process that tracks unit locations and inter-unit channel conditions. The routing process uses characteristics of the channels between two or more units, such as but not limited to, the data rate, reliability, number of unit hops, load, congestion, requested Quality of Service (QoS), etc. Additional factors can be used in routing evaluation, such as, desired QoS to be provided to a user, device or process. For example, where a user is using a voice feature of a device, the routing process attempts to ensure at least a minimum data rate or time delay with no dropouts to make sure the voice quality is maintained. This feature has a higher level of service than, for example, downloading a file since a pause in file downloading does not have as critical an effect on the user. One advantage of the present invention is the capability to determine the required level of service based upon the feature requested by the user of the network. Therefore, the user does not have to be concerned about the network conditions, whereas, in other networks, the user may have to stop the conversation or take other actions until the radio conditions improve.

Other aspects of the routing process include registration or detection of transceiver location. Where fixed units are installed in homes, the user can manually describe the location so that, for example, latitude and longitude coordinates could be derived. A built-in GPS receiver could also perform the same task. Another approach is to triangulate transceiver location by using the positions of multiple known transceivers. Data about various characteristics of units that is useful for routing purposes is maintained in tables (or other forms of storage) in various units, in a central location or both. Such tables are propagated throughout the network as needed. As units are brought into, taken from, or moved within the network, the routing process (or processes) attempts to maintain desired levels of service.

One feature of the RF transmitters used in the present invention is the use of antenna arrays for directional transmission. This allows transmitters so-equipped to "steer" a radio beam to specific receivers so that greater distance with less power is achieved. The receiving ability of such antennas is also directional so that receiver sensitivity to specific units at known locations can be increased. Further, this approach reduces the interference from potentially competing signals. This, in turn, increases network efficiency and can, therefore, enhance network density and performance.

Units can be connected to other wireless or wired networks, such as but not limited to, the Internet, corporate or campus intranets, home networks, etc. Services, such as, streaming of media can be provided within a household or to other friends or users. Security and access controls are provided. One aspect of the system allows units to relay information without storing the information in order to comply with typical media licenses or copyrights. The system provides flexible permission granting, control and other features to manage use of media, objects or other data.

Generally, all the data can be relayed securely without any ability to interpret data that is in transit through a node or nodes. The system allows for end-to-end encryption to protect traffic being routed along the communication route. Alternatively, some portions or links of the communication route are protected with encryption while other portions are not, and different portions of the communication route can be protected using different encryption codes or technologies. This is advantageous for a number of reasons. For example, in order to comply with certain country specific regulatory or other issues, it may be necessary to terminate the secure link at one or more intermediary nodes and then forward the traffic using a different encryption code or in clear text; in another instance, it may also be required to re-encrypt the already encrypted channel with another encryption code.

Other aspects of the present invention include user interfaces of the units, scalability of the network, etc.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 1 is a simplified schematic block diagram illustrating one exemplary embodiment of the present invention.

DETAILED DESCRIPTION OF THE INVENTION

The present invention in the form of one or more exemplary embodiments will now be described. FIG. 1 is a simplified schematic block diagram illustrating one exemplary embodiment of the present invention. In this exemplary embodiment, the network 10 includes a number of mobile radio units (each an MRU) 12 and a number of semi-fixed or fixed radio units 14 (each an FRU). Based on the disclosure and teachings provided herein, a person of ordinary skill in the art will appreciate that other types of devices that are able to send and receive signals, i.e., transceivers, can be used as MRUs or FRUs in accordance with the present invention.

In one exemplary embodiment, the MRU 12 is a user portable device that is capable of handling wireless communications. The MRU 12 includes two types of high bandwidth radio, one is used for long range relay communication and the other for short range local communication. The MRU 12 is capable of communicating with nearby MRUs and FRUs 14. The MRU 12 is also capable of communicating with local accessory devices, such as but not limited to, wireless keyboard, wireless mouse, wireless audio devices, etc.

The MRU 12 also includes communication components that are capable of communicating with a secure token, such as but not limited to, a smartcard 16, a subscriber identity module (SIM) card and other types of authentication devices. As will be further described below, the smartcard 16 is used to store user and security information that is specific to a user. The user and security information can be used to provide end-to-end encryption, that is, the user data is encrypted on the MRU 12 and only decrypted by the receiving node. Alternatively, the encryption of the user data can also take place at any intermediate node. In addition, the use of multiple smartcards 16 allows a single MRU 12 to be shared by many different users.

The FRU 14 is a device that utilizes high bandwidth long range radio for communication. The FRU 14 also uses a short range radio for local communication with MRUs 12. The FRU 14 is capable of communicating with other FRUs 14 and the MRUs 12. The FRU 14 is also capable of communicating with a number of entities including data storage devices, such as but not limited to, hard disks and DVD/CD-ROM drives, fixed networks, such as but not limited to, the Internet 18, a public switched telephone network (PSTN) 19, and an integrated services digital network (ISDN), and wireless networks, such as but not limited to, a public land mobile network (PLMN), a wireless local area network and a cellular network (e.g., 3G, CDMA, GSM, GPRS and TDMA). In one exemplary implementation, the FRU 14 communicates with a media server that controls access to media and fixed network services. Furthermore, in one exemplary embodiment, the FRU 14 provides an open accessible radio interface (open domain) as a backbone network and a closed radio access (closed domain) for MRUs 12 and their users that are registered with that FRU ("Home FRU" 20). As will be further described below, information or services that are available in the open domain allow, amongst other things, communications with other FRUs. In the closed domain, information or services can only be accessed by MRUs or users that are registered with the Home FRU. Information and services that are available respectively from the open and closed domains of an FRU may vary depending on each specific FRU. Such information and services that are available from an FRU include, for example, applications such as but not limited to games and other utility programs, audio data such as music, video data such as pictures and images, and audio/video data such as movies. In addition, FRUs or MRUs may also locally cache data, for example web pages, in order to provide a speedier service within the network.

The network 10 operates in the following exemplary manners. The network 10 has a number of different types of connections. A semi-fixed long range high bandwidth (HBLR) connection that is used to interconnect the FRU relay points. A short range high bandwidth connection also exists on the MRU and the FRU, that is used to interconnect those devices. The MRU also has a very short range medium bandwidth connection to allow for radio communications with local MRU accessory devices.

When a new FRU is first introduced into the network, the new FRU engages in an initialization mode. When in this mode, the new FRU uses its HBLR connection to listen to or detect other FRUs in the network that are in its locale or coverage area. Upon detecting other FRUs, the new FRU attempts to establish connections with these other FRUs. Other FRUs are detected, for example, by monitoring their radio links or pilot information that maybe periodically broadcast by each device. The pilot information that is sent may include, but is not limited to, FRU identity, status, power information, channel information etc. From these other FRUs, the new FRU determines its relative position in terms of location within the network. Based on this information, the new FRU assigns itself a unique address in the network. In carrying out these actions, the new FRU builds up a table of local FRUs, their respective addresses, radio frequencies that these local FRUs may be using and the quality of the radio links amongst the local FRUs. The position of the new FRU can be determined in a number of ways including, for example, triangulation, GPS receiver or direct knowledge from data input to the device. It should be noted that the new FRU may generate for itself an address that is already in use. When a duplicate address is generated, the neighboring FRUs inform the FRU that its self-assigned address needs to be changed as soon as the FRU uses that address on the network. The FRU MAC address can be used to identify the duplicate address. This allows the network addressing to remain homogeneous without duplicate addresses.

By using the foregoing approach, the new FRU is able to establish a picture of its location in the network and how to route traffic within the network. Once the new FRU has determined its location in the network, the new FRU then announces its presence to other FRUs. The other FRUs within radio contact range of the new FRU then add the new FRU to their route tables and make note of the radio link quality associated with the new FRU. By announcing its presence to other FRUs, the new FRU effectively provides another optional route to these other FRUs for routing their traffic. For example, due to the superior quality of the radio link associated with the new FRU with respect to a particular FRU, this particular FRU is able to provide better QoS using the new FRU. Once the FRU has established itself in the network, the FRU announces its presence to the MRUs so that the MRUs may also use the FRU as a relay point to the network. Furthermore, the newly established FRU also allows the owner of the FRU to create a user or Home FRU, as further described below. If the FRU loses communications with other FRUs or otherwise has a problem communicating, the FRU informs all the associated MRUs and breaks any links so these associated MRUs may move to another FRU.

Once the new FRU is introduced into the network, the FRU acts as an intelligent relay point. A sending FRU wishing to route data to a specific destination looks to transmit the data to a receiving FRU. This decision to transmit the data to the receiving FRU is based on a number of factors, including but not limited to, link quality, radio link quality, number of hops to destination, traffic load conditions, application requesting the data transfer, type of data to be transferred and requested QoS. Once the receiving FRU is identified, the sending FRU transmits the packet that it wishes to send and the receiving FRU acknowledges receipt of the packet if the packet is successfully received. Alternatively, the receiving FRU may negatively acknowledge receipt of the packet indicating that the receiving FRU either has received a bad packet or has no route for the packet. In the event that the sending FRU does not receive any acknowledgement, which indicates that the transmitted packet was lost, the sending FRU may then optionally look for an alternative route in the form of another FRU to resend the packet. Each packet is associated with the required QoS. This QoS may range from high, for real time traffic, to low, for best effort traffic. In one exemplary embodiment, there are at least four levels of QoS. However, based on the disclosure and teachings provided herein, a person of ordinary skill in the art will appreciate that there could be more or fewer levels of QoS depending on network and/or design requirements.

An FRU having traffic to send may also act as a relay point for packets arriving from other FRUs that are in contact with such FRU. Based on the respective sources of the received packets, the FRU is able to determine a more efficient route for packets that it originates and wishes to send. More specifically, upon receiving a packet destined for another FRU or node, the Media Access Control (MAC) layer of the FRU examines the QoS associated with the packet and determines which queue to use for forwarding the packet. Different queues correspond to different routes in the network that are available to the FRU for forwarding packets. Generally, higher QoS packets take priority; however, in order to avoid congestion in the network, lower QoS packets are still serviced in the network depending on the length of the queues. Queuing algorithms are well known in the art. Based on the teachings and disclosure provided herein, a person of ordinary skill in the art will appreciate how to select the appropriate queuing algorithm for use in connection with the present invention.

The present invention has many benefits and advantages. For example, one of the advantages of the present invention is that the FRUs can be placed anywhere in the network and the FRUs can establish their own routes within the network. Indeed, there is no need for any centralized control as maybe found in a traditional wireless or wired network. The present invention provides for a network that is decentralized and can perform peer-to-peer routing without the intervention of a third node to provide routing information. In addition, as more and more FRUs are installed, the average distance between FRUs decreases and this decrease in distance accordingly improves the radio link quality between FRUs. The improvement in radio link quality, in turn, brings about higher bandwidth links between FRUs thereby improving the overall performance of the network.

The routing algorithm used in each FRU takes into consideration several aspects or characteristics of the network. Each FRU receives information relating to such aspects or characteristics from its MAC and radio physical layer. One such characteristic is the quality of the radio links offered to the FRU. Another such characteristic is the congestion level of the network. Additionally, by modifying the power used and bandwidth of the transmission, the FRU may decide to link with another FRU that is not one of the nearest neighbors. This could be used to reduce the number of hops on the route between the source and destination. This could be important in reducing the delays associated with the traffic being sent. Based on the teachings and disclosure provided herein, a person of ordinary skill in the art will appreciate other network characteristics that can be used in connection with the routing algorithm of the present invention.

Furthermore, the routing algorithm also uses conditions specified in a packet. Such conditions include, for example, QoS. Using network characteristics and packet specified conditions as criteria, the routing algorithm then determines the route to be used to relay a packet. For example, if a packet specifies a high QoS, this may require the FRU to identify the shortest route between two network nodes. Consequently, the routing algorithm optimizes a route to remove any redundant nodes. This could be performed by any node in the network that determines it is not using an optimum route to the destination. The optimum route to the destination can be determined based on a number of factors. For example, an optimum route can be based on the lowest number of intermediary units or a number of intermediary units that is equal to or fewer than a predetermined threshold. Furthermore, intermediary units in the optimum route can be selected based on different factors. For example, one intermediary unit may be included in the optimum route based on its radio link quality; another intermediary unit may be included based on a different criterion such as data rate. Moreover, the factors or criteria that are used to select an intermediary unit may vary over time. Based on the disclosure and teachings provided herein, a person of ordinary skill in the art will know of other factors that can be used to determine the optimum route to a destination as well as intermediary units to be used in the optimum route. In addition, since the network is radio-based, FRUs may disappear or otherwise become unavailable for a number of reasons including, for example, power failure, thus rendering one or more entries in routing tables obsolete. When an FRU becomes unavailable, the routing algorithm attempts to re-route traffic around the unavailable FRU.

Moreover, each FRU also collects routing and device information from MRU(s) that are available within its coverage area. As will be further described below, the MRU(s) can also be used for forwarding traffic. Hence, such information can be used by the routing algorithm of the FRU to generate an optimum route.

Based on the teachings and disclosure provided herein, it can be seen that, when directed to do so, the routing algorithm associated with each FRU continuously selects the optimum route based on both user application and traffic requirements. Unlike conventional wireless technologies that utilize worst case RF design principles, the present invention as described above is capable of optimizing its own performance in response to prevailing conditions. For example, an FRU may have initially selected the route with the best link quality in order to maximize success of the transmission. However, if other links appear with a better quality, then the FRU has the option to switch to those other links, even in the middle of packet transfers.

Another advantage of the present invention is that it can take into consideration congestion on the network. In most current wireless systems, the capacity of the network is designed for worst case conditions. This usually means that several nodes are much larger and therefore more expensive than would normally be required under average conditions. However, in the network described above, the network is able to take into account congestion problems that may occur subsequently and re-route traffic further upstream thus avoiding the congestion point. Hence, nodes in the network only need to be designed to carry the average load, thereby significantly reducing the cost of the network deployed.

In addition to having the capability to communicate with other FRUs, each FRU optionally includes the capability to access one or more fixed networks in order to provide connectivity to various other types of services, such as, web or voice services. In one exemplary implementation, an FRU includes a set of fixed connections which allow communications with other fixed networks, such as, the Internet and the PSTN. By having access to one or more fixed networks, the FRU allows a user to enjoy additional services provided by such networks.

In one exemplary embodiment of the present invention, MRUs can also be used to facilitate communications in the network. Each MRU includes a similar short range radio or high bit rate radio connection (HBSR). The use of the HBSR connection allows an MRU to communicate with the FRUs and/or other MRUs in its locality. Communications with other MRUs effectively allow smaller networks to be set up within the network, especially if an MRU is not within range of an FRU. The MRU uses the same routing algorithm as described above in connection with the FRU to route traffic to a nearby FRU or MRU. Therefore, it is possible for the network to take advantage of a cluster of MRUs to route traffic through a congested area. The MRU initially looks to route any data it may have to send to an FRU first. However, if the MRU is located on the edge of the network, the MRU can use the routing algorithm to direct traffic via one or more MRUs to reach an FRU. Also, congestion is likely to occur where MRUs cluster due to traffic generated by such MRUs. Such MRU cluster can be used to reduce congestion. Instead of traffic going through nearby FRU(s), traffic can be routed through one or more MRUs within the MRU cluster thereby avoiding overloading any nearby FRU(s). By using the foregoing approach, network capacity is created dynamically and does not need to be statically set as would be required in a traditional wireless network.

Furthermore, the connectivity of the MRU is not fixed. An MRU can take advantage of any other connectivity that might be available. An MRU is able to identify the most appropriate FRU(s) and/or MRU(s) for transmitting traffic on a dynamic basis depending on the network conditions. For example, even when the MRU remains temporarily fixed within a certain area, an FRU or MRU that was previously used by the MRU to route traffic may become unavailable. When this occurs, the MRU uses its associated routing algorithm to dynamically select another FRU or MRU that is most suitable or effective for routing its traffic. In another example, the MRU physically roams from one area to another. As a result, the previously selected FRU or MRU may no longer be the most suitable or effective for routing traffic for the roaming MRU. Hence, the roaming MRU may similarly use its associated routing algorithm to dynamically select another FRU or MRU for routing its traffic.

Since the MRU is capable of communicating and exchanging traffic with the FRU(s) and other MRU(s), the routing algorithm used by the MRU utilizes information received from the FRU(s) and/or other MRU(s) as well as other information to identify the most appropriate FRU(s) and/or MRU(s) for routing its traffic. For example, the MRU may detect all the FRU(s) and/or MRU(s) that are available to it for routing traffic and the routing algorithm associated with the MRU then determines which one or more of the detected FRU(s) and/or MRU(s) are most appropriate for routing its traffic. In determining the most appropriate FRU(s) and/or MRU(s), the MRU may evaluate a number of factors including, for example, the radio link quality of the detected FRU(s) and/or MRU(s) and routing information already collected by the respective detected FRU(s) and/or MRU(s). For example, an MRU that is trying to communicate with another MRU that is in its radio range may choose to use an intermediary MRU or FRU in order to improve the bandwidth or other QoS that may be required for the active service. Based on the teachings and disclosure provided herein, a person of ordinary skill in the art will appreciate how to select factors that can be used in determining the most appropriate FRU(s) and/or MRU(s) in accordance with the present invention.

The MRU is further capable of communicating with other local devices using its short range medium bandwidth radio. These local devices include, for example, headsets, LCD screens or other accessories that are designed to provide or receive information from the MRU. For instance, the FRU may transmit music in the form of audio data to the MRU. The MRU, in turn, forwards the audio data to a headset which allows a user to listen to the music. Similarly, the FRU may transmit video images in the form of video data to the MRU. The MRU then forwards the video data to a LCD screen which allows the user to view the video images.

As described above, the topology of the network of the present invention is dynamic. Since the topology of the network is dynamic, the coverage of the network can expand or contract depending on the number of FRU(s) and MRU(s) that are currently operational at any instant. Furthermore, as more and more FRU(s) and MRU(s) are added to the network, the network can perceivably extend to cover large geographical areas.

Also as mentioned above, an MRU 12 is capable of accommodating a secure token, such as but not limited to, a smartcard 16, a SIM card and other types of authentication devices. Information stored on the smartcard 16 includes user and security information relating to the user, such as but not limited to, serial number, biometric data or keys associated with the user. Such information can be used to provide end-to-end encryption on the network to improve security. When a user attempts to access the Internet, user data or any entity associated with the FRU, the control logic associated with the FRU recognizes the destination for the issued command and uses the security information (such as, the keys associated with the user) extracted from the smartcard 16 to authenticate the user (or the MRU) and encrypt the data stream. When the data arrives at the destination FRU, the data can be decoded only if the source of the data is from an authentic MRU. Furthermore, in one exemplary implementation, the authentication is location dependent, meaning that the user (or the MRU) is only authenticated when the user (or the MRU) is located at a specific geographic or physical location, or alternatively, when the user (or the MRU) communicates with a specific FRU. By using the foregoing approach, data can be encrypted and the user sending the data can also be authenticated. Encryption and authentication techniques are well known in the art. Based on the teachings and disclosure provided herein, a person of ordinary skill in the art will know how to select and implement the appropriate encryption and/or authentication techniques for use in connection with the present invention. Since the encryption is end to end, this approach allows the user to employ relay nodes secure in the knowledge that the intermediate nodes cannot eavesdrop on the transmission.

In addition to providing end-to-end encryption, alternatively, some portions or links of the optimum route are protected with encryption while other portions are not, and different portions of the optimum route can be protected using different encryption codes or technologies. This is advantageous for a number of reasons. For example, in order to comply with certain country specific regulatory or other issues, it may be necessary to terminate the secure link at one or more intermediary nodes and then forward the traffic using a different encryption code or in clear text; in another instance, it may also be required to re-encrypt the already encrypted channel with another encryption code.

From a user perspective, the network 10 can be used to send and receive data in an efficient and simple manner as illustrated below. A user (or alternatively, an MRU) is registered to a user or Home FRU. User and security information associated with the user is stored in a smartcard. Such information is used to identify and authenticate the user when a local MRU being used by the user attempts to establish communication with the user or Home FRU. Once the user is authenticated, information or services that are available from the closed domain of the user or Home FRU can be accessed by the user using the local MRU. Such information or services from the closed domain include, for example, a song or a movie that has been stored by the user in a storage device that is accessible to the user or Home FRU.

In one situation, the local MRU being used by the user is in direct communication with the user FRU. In other words, there are no intermediate FRU(s) and/or MRU(s) between the local MRU and the user FRU.

In a second and perhaps more common situation, the user wishes to use a remote MRU to retrieve information and/or services from the closed domain of the user's FRU. The remote MRU is located out of range of the user FRU and, hence, direct communication is not possible. Consequently, as described above, an appropriate route having intermediate unites) is identified by the remote MRU in order to allow the remote MRU to communicate with the user FRU. The intermediate unites) include one or more FRU(s) and/or MRU(s). Similarly, information stored in the smartcard is retrieved by the remote MRU and is used to authenticate the user to the user FRU. Information from the smartcard further allows secure transmission on the route established between the remote MRU and the user FRU. Once the route is identified, information and services that are available from the closed domain of the user FRU can be provided to the user via the remote MRU. As mentioned above, the route used for communications between the remote MRU and the user FRU may change on a dynamic basis depending on a number of factors, such as, existing network conditions and conditions specified in the packets to be transmitted. In other words, the intermediate unites) that are used to carry traffic between the remote MRU and the user FRU may change dynamically from time to time.

In one exemplary embodiment, the present invention is designed to operate in the 5 GHz ISM band. However, based on the disclosure and teaching provided herein, it should be appreciated by one of ordinary skill in the art that the present invention could be used at any frequency.

It should be understood that the present invention can be implemented in the form of control logic using software, hardware or a combination of both, in a modular, distributed or integrated manner. Based on the teachings and disclosure provided herein, a person of ordinary skill in the art will know of other ways and/or methods to implement the present invention.

Although the present invention has been described with reference to specific embodiments thereof, these embodiments are merely illustrative, and not restrictive, of the present invention. For example, although the system has primarily been described with respect to radio-frequency transmissions, any type of communication link that permits mobile transceivers is possible. For example, infrared or other portions of the electromagnetic wave spectrum, acoustic or other communication links can be used. Fixed and mobile units can be provided with many different types of processing ability, or very minimal, or no, processing ability. For example, a device may merely act as a repeater to send data along to another device.

It should be understood that the present invention as described above can be realized in the form of control logic, implemented in software or hardware or a combination of both, in either an integrated or distributed manner. A person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A multihop wireless communication network, comprising:
   one or more mobile radio units (MRUs) including a first node; and
   a plurality of fixed radio units (FRUs) including a second node and one or more other nodes that are adaptable to serve as intermediate nodes along a plurality of possible multihop paths that are configurable between said first and second nodes;
   wherein said first node (MRU) is configured to dynamically determine which multihop path of said plurality of possible multihop paths is used to transmit data packets from the second node (FRU) to the first node (MRU), while the data packets are being transmitted from the second node to the first node.

2. The multihop wireless communication network of claim 1, wherein said first node is configured to dynamically determine which multihop path of said plurality of possible multihop paths is configured between the first and second nodes, in order to maintain a requested quality of service (QoS) provision.

3. The multihop wireless communication network of claim 1, wherein said first node is configured to dynamically determine which multihop path of said plurality of possible multihop paths is configured between the first and second nodes, in order to maintain a communication connection between the first node and the second node.

4. A method of selecting an optimum route in a fixed radio unit (FRU) in a multihop wireless communication network, the method comprising:
   determining a first link having a maximum link quality;
   selecting a first multihop route including the first link;
   communicating data using the first multihop route; and
   while communicating the data:
      monitoring a second link;
      determining the second link has a different link quality than the first link, wherein a second multihop route includes the second link;
      selecting, based on the different link quality, the second link; and
      switching, in the middle of packet transfer, to communicate the data using the second multihop route.

5. The method of claim 4, further comprising, while communicating the data:
   detecting a congestion point; and
   instructing a node upstream to re-route traffic thereby avoiding the congestion point.

6. The method of claim 4, further comprising:
   receiving a requested quality of service (QoS) provision;
   wherein selecting, based on the different link quality, the second link comprises selecting the second link in order to maintain the requested QoS provision.

7. The method of claim 4, further comprising, while communicating the data:
   receiving a change in a requested quality of service (QoS) provision; and
   wherein selecting, based on the different link quality, the second link comprises selecting the second link in order to respond to the change in the requested QoS provision.

8. The method of claim 4, wherein selecting, based on the different link quality, the second link comprises selecting the second link in order to maintain a communication connection between the first node and the second node.

9. The method of claim 4, wherein selecting, based on the different link quality, the second link comprises selecting the second link in order to reduce a number of hops along the first multihop route.

10. The method of claim 4, wherein selecting, based on the different link quality, the second link comprises selecting the second link in order to reduce a traffic load experienced by an intermediate node along said first multihop route.

11. The method of claim 4, wherein selecting, based on the different link quality, the second link comprises selecting the second link based on a change in a radio link quality of an intermediate node along said first multihop route.

12. The method of claim 4, further comprising basing authentication on connecting to a specific FRU.

13. A fixed radio unit (FRU) device for selecting an optimum route in a multihop wireless communication network, the device comprising a processor, memory and computer instructions for:
   determining a first link having a maximum link quality;
   selecting a first multihop route including the first link;
   communicating data using the first multihop route; and
   while communicating the data:
      monitoring a second link;
      determining the second link has a different link quality than the first link, wherein a second multihop route includes the second link;
      selecting, based on the different link quality, the second link; and switching, in the middle of packet transfer, to communicate the data using the second multihop route.

14. The device of claim 13, wherein the computer instructions further comprise instructions for, while communicating the data:
   detecting a congestion point; and
   instructing a node upstream to re-route traffic thereby avoiding the congestion point.

15. The device of claim 13, wherein the computer instructions further comprise instructions for:
   receiving a requested quality of service (QoS) provision;
   wherein selecting, based on the different link quality, the second link comprises selecting the second link in order to maintain the requested QoS provision.

16. The device of claim 13, wherein the computer instructions further comprise instructions for, while communicating the data:
   receiving a change in a requested quality of service (QoS) provision; and
   wherein selecting, based on the different link quality, the second link comprises selecting the second link in order to respond to the change in the requested QoS provision.

17. The device of claim 13, wherein computer instructions for selecting, based on the different link quality, the second link comprises computer instructions for selecting the second link in order to maintain a communication connection between the first node and the second node.

18. The device of claim 13, wherein computer instructions for selecting, based on the different link quality, the second link comprises computer instructions for selecting the second link in order to reduce a number of hops along the first multihop route.

19. The device of claim 13, wherein computer instructions for selecting, based on the different link quality, the second link comprises computer instructions for selecting the second link in order to reduce a traffic load experienced by an intermediate node along said first multihop route.

20. The device of claim 13, wherein computer instructions for selecting, based on the different link quality, the second link comprises computer instructions for selecting the second link based on a change in a radio link quality of an intermediate node along said first multihop route.

21. The device of claim 13, wherein the computer instructions further comprise instructions for basing authentication on connecting to a specific FRU.

* * * * *